Aug. 4, 1959     A. I. MORGAN, JR     2,898,245

HEAT TREATMENT OF SUGAR BEET JUICE

Filed June 16, 1958

ARTHUR I. MORGAN, JR.
INVENTOR

BY J. A. Seegrist ATTORNEY

United States Patent Office 2,898,245
Patented Aug. 4, 1959

2,898,245

HEAT TREATMENT OF SUGAR BEET JUICE

Arthur I. Morgan, Jr., Berkeley, Calif., assignor to the United States of America as represented by the Secretary of Agriculture Application June 16, 1958, Serial No. 742,444

5 Claims. (Cl. 127—50)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

Figure 1:
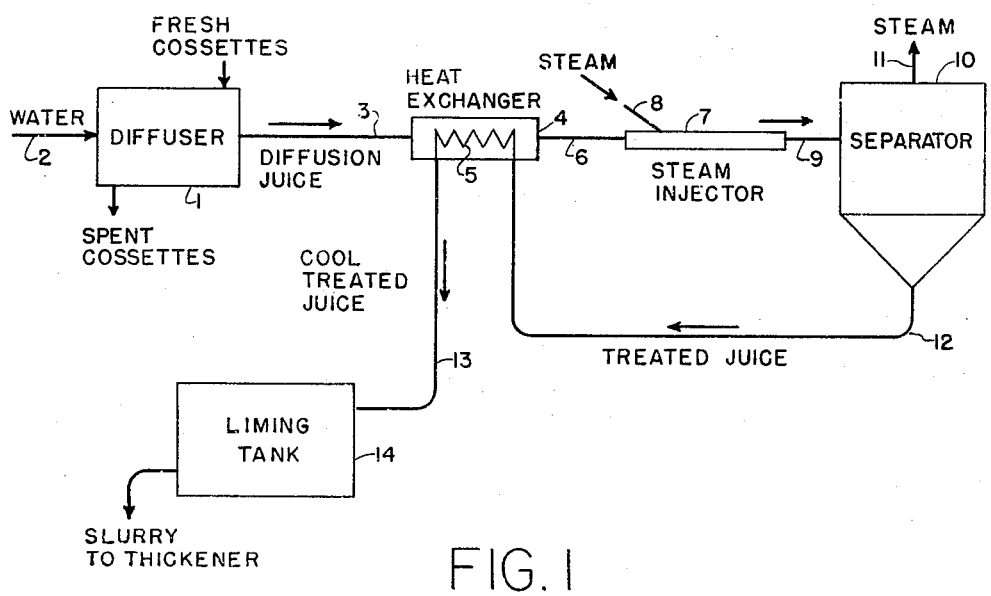
Figure 2:
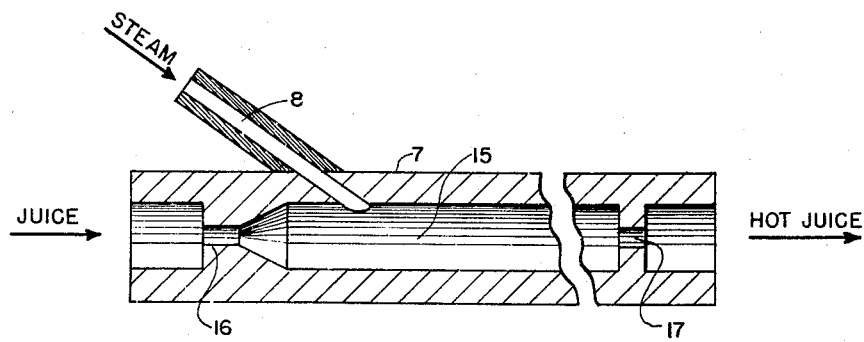

This invention relates to the processing of sugar beet diffusion juice. More particularly, the invention concerns and has as its primary object the provision of methods for treating sugar beet diffusion juice to obtain a juice of substantialy improved properties whereby further treatment of the juice by conventional techniques is facilitated. These and other objects of the invention will be evident from the following description taken in connection with the annexed drawing wherein:

Fig. 1 schematically depicts apparatus for applying the process of the invention and Fig. 2 represents a side elevation in cross-section of the steam injector heater.

In conventional methods for preparing sugar from sugar beets, the following technique is employed. Sugar beets are cut into pieces, termed cossettes in the industry. These cossettes are then treated with warm water to extract the sugar therefrom. This procedure, universally referred to as diffusion, may be carried out batchwise or, more efficiently, by a continuous process. In the continuous process, the cossettes are carried through the diffuser by the use of drag chains, helical scrolls, or other mechanical devices. At the same time, water is passed through the diffuser in a direction countercurrent to the direction of cossette travel. The resulting sugar solution, known as diffusion juice, must then be purified to remove impurities such as proteins, pectins, and other colloidal or gummy impurities. This purification is accomplished by treating the diffusion juice with lime and then introducing carbon dioxide gas into the limed juice. The resulting precipitate of calcium carbonate occludes much of the colloidal impurities which are thereby removed with the calcium carbonate when the juice is clarified. Although this purification method is universally used, it involves considerable expense for reagents and apparatus. For example, it is customary to employ about 2 lbs. of lime (CaO) for each 100 lbs. of beet cossettes. This amount of lime will require at least 1.5 lbs. of carbon dioxide per 100 lbs. of beets for subsequent carbonation.

In accordance with the invention, the diffusion juice prior to liming and carbonation is subjected to a heat treatment. This treatment results in a drastic improvement of the properties of the juice. Notable among the improvements is that the foaming properties of the juice are reduced. This is an important factor which facilitates the treatment of the juice in the subsequent carbonation and evaporation steps. It is believed that this reduction in foaming properties is attained through destruction of saponin constituents of the juice during the heat treatment. Another significant improvement is that the heat-treated juice contains a reduced proportion of dissolved gummy or thickening components. As a consequence, the treated juice requires a lesser proportion of lime and $CO_2$ for its purification. By applying the principles of the invention the proportions of lime and carbon dioxide may be halved or even quartered to still obtain a purified juice ready for evaporation and crystallization of sugar. It is believed that this result of a reduced proportion of dissolved gummy substances is attained through a degrading of proteinous and pectinous components during the heat treatment whereby these components are split into smaller fragments. However, some of the gummy components may be precipitated rather than fragmented. Regardless of any theoretical considerations, however, the fact remains that the heat treatment does effect a purification so that the juice requires less lime and carbon dioxide to prepare a completely purified juice.

The heat treatment in accordance with the invention involves bringing the temperature of the diffusion juice up to 150–250° C. and holding it at this temperature for a brief period of time, that is, about ¼ to 3 minutes. In most cases, the improvement of the juice is effectuated in about ¼ to ½ minute and longer holding times accomplish little if any further improvement. After this heating period, the juice is rapidly cooled to prevent decomposition of desired components. Usually, the juice is cooled to about 70–90° C. and is then at the proper temperature for the conventional liming and carbonation treatment. Since the heating of the juice involves temperatures above the normal boiling point, this step is carried out in closed, pressure-resistant apparatus to maintain the juice in the liquid phase. Usually it is preferred that the juice be subjected to direct contact with steam whereby rapid heating is achieved without any danger of localized overheating or burning-on as may be encountered in systems wherein heating through a solid medium is employed. However, part of the heating may be through a solid medium, especially the first part of the heating, that is, where the juice is raised up to 100° C. At this range the danger of localized overheating or burning on the hot surface is relatively remote. Such preheating is also advantageous to avoid dilution of the juice in the subsequent step where heating by direct contact with steam is employed.

It is to be noted particularly that the heat treatment in accordance with the invention does not harm the desired constituent (sucrose) in the diffusion juice. Thus the heat treatment does not cause any measurable increase in proportion of reducing sugars, nor does it cause other destruction of sucrose. A further significant advantage of the process is that the improvements in the characteristics of the juice are achieved without adding any substances thereto. The treatment involves only physical manipulations and no reagents or other extraneous materials are employed.

A preferred method of applying the invention in a continuous manner is explained below in connection with the annexed drawing:

Referring first to Fig. 1, water is introduced into diffuser 1 via pipe 2 wherein it is contacted with a countercurrent flow of fresh beet cossettes. The diffusion juice so produced flows out of diffuser 1 via pipe 3.

The diffusion juice is then preferably preheated to about its boiling point by thermal exchange. Such procedure is advantageous in that it eliminates dilution of the juice in the subsequent step when the juice is directly contacted with steam. To this end, the diffusion juice is introduced by pipe 3 into heat exchanger 4 where it is heated by thermal exchange through the hot liquid in coil 5. Generally, the entering diffusion juice is at about 60 to 80° C. and by passage through heat exchanger 4 it is brought up to its boiling point or close thereto, i.e., about 90 to 100° C.

The preheated diffusion juice flows from exchanger 4 through pipe 6 into steam injector heater 7 where it is contacted with steam entering via inlet 8. In heater 7 the juice and steam are thoroughly mixed by the turbulent conditions therein existing and the juice is rapidly brought to the desired treatment temperature of 150–250° C. The hot juice is maintained in heater 7 for the required period and kept under pressure to maintain it in the liquid phase.

The hot mixture from heater 7 then flows through pipe 9 into vapor separator 10. In this separator, the pressure on the hot mixture is released and a flash evaporation takes place with simultaneous cooling of the juice. Separator 10 may be operated at atmospheric pressure to cool the juice to its normal boiling point or under vacuum to cool it below its boiling point, that is, to about 70–100° C. Steam released from the hot liquid is removed from the separator by vent 11. Where the separator is maintained under vacuum this vent is connected to a source of vacuum through a condenser in conventional manner. Vent 11 may be connected to the steam chest of one of the evaporators used to concentrate the purified juice. In this way the steam released from separator 10 may be utilized in the plant as a source of heat and the apparatus using this steam acts as a condenser in the vacuum system applied to vent 11. Separator 10 is preferably of the cyclone type in which the hot juice from pipe 9 enters tangentially to facilitate separation of the vapor and liquid by centrifugal action.

The juice from the base of separator 10, although substantially cooled relative to the treatment temperature, may still be above the temperature desired for further processing, particularly where separator 10 is operated at atmospheric pressure or at a low vacuum. Accordingly, the juice may be further cooled by utilizing it to preheat the incoming diffusion juice. To this end the juice from separator 10 is conducted by pipe 12 through coil 5 of heat exchanger 4, counter-current to the flow of the fresh diffusion juice through this apparatus. Thereby the juice from the separator, for example, at about 90–100° C. is cooled to about 70–80° C. and the diffusion juice brought up to about the boiling point. It is evident that this step of further cooling of the juice from separator 10 is only necessary where the separator is operated under such conditions, particularly as to pressure, that the separated juice is not directly ready for liming and carbonation. Where separator 10 is, for example, operated under such a degree of vacuum that the separated juice is at about 80° or less, the separated juice may be limed directly. In such event the preheating of the fresh juice in exchanger 4 would be accomplished with steam or other hot fluid available in the plant.

After the heat treatment and cooling of the juice, further processing is conducted in conventional manner. Thus the cooled treated juice from coil 5 is conducted by pipe 13 with liming tank 14 wherein it is treated with lime and $CO_2$ in conventional manner but with reduced amounts of these agents. The resulting slurry is clarified, the clarified juice concentrated, and sugar crystallized from the concentrated juice all in known manner.

Fig. 2 illustrates in detail steam injector 7. Referring to this figure, the diffusion juice is pumped through orifice or valve 16 into chamber 15. At the same time steam is introduced through inlet 8 into chamber 15. Inlet 8 is preferably so positioned that its axis subtends an acute angle with the axis of the chamber 15 and moreover the inlet enters tangentially to the inner surface of the chamber. These factors cause the incoming stream of steam to take a spiral path in chamber 15 thereby creating turbulence with the result that the steam and juice are intimately mixed and the juice is almost instantaneously brought up to the selected temperaure. (Alhough only one steam inlet 8 is depicted in the figure, it may be desired to provide a multiplicity of such inlets adjacent to the entry end of chamber 15 to facilitate introduction of the required amount of steam without bumping.) It is evident that the amount and temperature of the steam admitted into chamber 15 is to regulated relative to the amount of juice and initial temperature thereof as to produce a hot mixture at the temperature desired for the treatment, that is, about 150–250° C. After the hot mixture remains in chamber 15 for the desired time, it flows through orifice 17 into the separator 10 as described above. Orifice 17 is necessary to maintain the pressure within chamber 15 at such a level that the material therein remains in the liquid phase. Orifice 17 may take the form of a valve whereby the size of the orifice may be varied as required. Also one may employ for orifice 17 a valve which is controlled by the pressure in chamber 15 so as to maintain the pressure in the chamber at the desired level, for example about from 70 to 600 p.s.i.a., to keep the material therein in the liquid phase. Valve systems responsive to the pressure in a vessel for maintaining the pressure therein at a predetermined level are well known in the art and need not be explained further herein.

It is evident that the length of chamber 15 is correlated with the other factors such as the rate of feed of the juice, diameter of the chamber, etc. that the hot juice remains therein for the required time of residence this being usually about ¼ to 1 minute. For example in a factory treating 3000 tons of beets per day, chamber 15 might comprise a 12-inch diameter pipe, 50 feet long, and providing a residence time of about ½ minute.

The invention is further demonstrated by the following illustrative examples.

*Example I*

A sample of sugar beet diffusion juice was heated to 150° C. by direct injection of steam and held under pressure to prevent evaporation for 30 seconds. The hot juice was then reduced to 100° C. by flash cooling in a centrifugal separator where the juice was separated from vapor.

Tests were then conducted on the treated juice and a sample of the original untreated juice. In one of the tests, the treated and control juices were filtered using the same filtration area and pressure. In this test the juices were filtered as such, without addition of any agents. The results are tabulated below.

| Test | Treated juice | Untreated juice (control) |
|---|---|---|
| Height of foam, 2 min. after shaking sample in tube, inches | ⅛ | 4 |
| Proportion of reducing sugars, p.p.m. | 840 | 927 |
| Time required to filter 25 ml. of juice using same filtration area and pressure, min. | [1] 12 | 5 |
| pH | 6.3 | 6.3 |
| Total dissolved solids, percent | 11.3 | 11.3 |
| Sucrose, percent | 10.1 | 10.1 |

[1] Higher filtration time demonstrates precipitation of colloidal substances as result of heat treatment.

*Example II*

Samples of sugar beet diffusion juice were heated to 177° C. for various times as set forth below. In each case, the sample was heated while confined within a container in an autoclave to maintain the juice in the liquid phase. After the heating period, each sample of juice was cooled to 93° C. and treated with calcium oxide (2% CaO based on the weight of beets). The limed juice was then carbonated until a pH of 10.1 was reached. The results obtained are set forth below:

| | Control | Samples | | |
|---|---|---|---|---|
| | | a | b | c |
| Time heated, min | 0 | 0.5 | 1.0 | 3.0 |
| Alkalinity after carbonation, percent CaO | 0.15 | 0.13 | 0.14 | 0.13 |
| Sedimentation rate (Dorr-Kynch), lb./hr./sq. ft | 3.0 | 6.0 | 7.1 | 7.3 |

Having thus described the invention, what is claimed is:

1. In the process of recovering sugar from sugar beets wherein beet material is extracted with water to produce a diffusion juice and the diffusion juice is treated with lime and carbon dioxide to purify it, the improvement which comprises treating the diffusion juice prior to liming and carbonation by heating it to a temperature of about from 150 to 250° C., holding it under pressure at this temperature for about from ¼ to 3 minutes and rapidly cooling it to reduce the foaming properties of the juice and to reduce its content of dissolved colloidal substances.

2. In the process of recovering sugar from sugar beets wherein beet material is extracted with water to produce a diffusion juice, the diffusion juice is treated with lime and carbon dioxide to purify it, and sugar is crystallized from the purified juice, the improvement which comprises treating the diffusion prior to liming and carbonation by heating it to a temperature of about from 150 to 250° C., holding it under pressure at this temperature to maintain it in the liquid phase for a period of about from ¼ to 3 minutes, and immediately cooling the hot juice to a temperature not higher than its normal boiling point whereby to reduce the foaming properties of the juice and to reduce its content of dissolved colloidal substances.

3. In the process of recovering sugar from sugar beets wherein beet material is extracted with water to produce a diffusion juice, the diffusion juice is treated with lime and carbon dioxide to purify it, and sugar is crystallized from the purified juice, the improvement which comprises treating the diffusion juice, free from added substances, prior to liming and carbonation by continuously introducing it into a zone wherein it is contacted with steam under turbulent flow conditions to rapidly raise the temperature of the juice to about from 150 to 250° C., holding the juice at such temperature while maintaining it under pressure to keep it in the liquid phase for a period of about from ¼ to 3 minutes, and immediately cooling the hot juice to a temperature not higher than its boiling point by continuously flashing it into a zone maintained under a pressure not above atmospheric pressure whereby to reduce the foaming properties of the juice and to reduce its content of dissolved colloidal substances.

4. In the process of recovering sugar from sugar beets wherein beet material is extracted with water to produce a diffusion juice, the diffusion juice is treated with purifying agents including lime and carbon dioxide, and sugar is crystallized from the purified juice, the improvement which comprises treating the diffusion juice, free from added substances, prior to liming and carbonation, by preheating it through thermal exchange to about its boiling point, contacting the preheated juice with steam supplied in such proportion and at such temperature as to raise the temperature of the juice to about from 150–250° C., holding the juice at such temperature for a period of about from ¼ to 3 minutes while maintaining it under pressure to keep it in the liquid phase, and immediately cooling the hot juice to a temperature not above its boiling point whereby to reduce the foaming properties of the juice and to reduce its content of dissolved colloidal substances.

5. A method for improving the characteristics of sugar beet diffusion juice prior to liming and carbonation which comprises preheating diffusion juice to about its boiling point by continuously conducting it through a first zone in thermal-exchange relationship with a countercurrent stream of hot liquid, continuously introducing the preheated juice into a second zone, contacting it in said second zone with steam under turbulent flow conditions to rapidly raise the temperature of the juice to about from 150–250° C., holding the juice at such temperature and while maintaining it under pressure to keep it in the liquid phase for a period of about from ¼ to 3 minutes, immediately thereafter continuously discharging the hot juice into a third zone maintained at a pressure not above atmospheric pressure, continuously separating the relatively-cooled, treated juice from evolved steam, continuously conducting said treated juice through said first zone to provide the hot liquid for preheating additional quantities of diffusion juice, the treated juice being further cooled by thermal-exchange with additional diffusion juice and providing a treated juice of reduced foaming tendencies and reduced content of dissolved colloidal substances.

References Cited in the file of this patent

UNITED STATES PATENTS

| | | |
|---|---|---|
| 1,094,436 | Gordon | Apr. 28, 1914 |
| 1,370,372 | Sherwood | Mar. 1, 1921 |
| 2,164,186 | Brown et al. | June 27, 1939 |
| 2,478,971 | Lindgren | Aug. 16, 1949 |